(12) United States Patent
Sacchetti

(10) Patent No.: US 8,413,673 B2
(45) Date of Patent: Apr. 9, 2013

(54) FLOW ACTUATED VALVE

(75) Inventor: Peter Sacchetti, Attleboro, MA (US)

(73) Assignee: Alcor Scientific, Inc., Warwick, RI (US)

( * ) Notice: Subject to any disclaimer, the term of this patent is extended or adjusted under 35 U.S.C. 154(b) by 0 days.

(21) Appl. No.: 13/312,947

(22) Filed: Dec. 6, 2011

(65) Prior Publication Data
US 2012/0138825 A1 Jun. 7, 2012

Related U.S. Application Data

(60) Provisional application No. 61/419,890, filed on Dec. 6, 2010.

(51) Int. Cl.
*G05D 11/00* (2006.01)

(52) U.S. Cl.
USPC ............................................ 137/112; 251/230

(58) Field of Classification Search .................. 137/111, 137/112, 625.41; 251/230
See application file for complete search history.

(56) References Cited

U.S. PATENT DOCUMENTS

| | | | |
|---|---|---|---|
| 1,856,350 A | 5/1932 | Metcalf | |
| 2,387,215 A | 10/1945 | Fawkes | |
| 3,554,224 A | 1/1971 | Kirk et al. | |
| 3,853,145 A * | 12/1974 | Judd | 137/624.18 |
| 4,116,216 A | 9/1978 | Rosenberg | |
| 4,178,963 A | 12/1979 | Riefler et al. | |
| 4,221,238 A | 9/1980 | Madsen | |
| 4,632,361 A | 12/1986 | Callison | |
| 4,729,406 A | 3/1988 | Frentzel | |
| 5,022,426 A | 6/1991 | Fischer | |
| 6,622,933 B1 * | 9/2003 | Young et al. | 239/66 |
| 8,137,541 B2 * | 3/2012 | Zook | 210/116 |
| 2009/0199915 A1 | 8/2009 | Novacek et al. | |
| 2009/0229692 A1 | 9/2009 | Rohwer et al. | |

* cited by examiner

*Primary Examiner* — Stephen M Hepperle
*Assistant Examiner* — R. K. Arundale
(74) *Attorney, Agent, or Firm* — Barlow, Josephs & Holmes, Ltd.

(57) ABSTRACT

A flow actuated valve includes a valve body, a diverter member, an actuator member, and a check disk. The valve body defines a first upper aperture, a second upper aperture, and a lower aperture. A check disk member connects to the actuator member to control the flow of fluid depending upon the direction of the flow of the fluid through the valve. When the check disk member is closed, the diverter member engages the actuator member to allow a first fluid to flow through the first upper aperture or to allow a second fluid to flow through the second upper aperture. In operation, the fluid is selected by changing the directional flow of the fluid to close the check disk member which causes the actuator member to engage the diverter member to either allow the first fluid source or the second fluid source to flow therethrough.

18 Claims, 25 Drawing Sheets

FLOW ACTUATED VALVE

CROSS REFERENCE TO RELATED APPLICATION

This application is related to and claims priority from earlier filed U.S. Provisional Application for Patent No. 61/419,890 filed Dec. 6, 2010, the entire contents of which are incorporated herein by reference.

BACKGROUND OF THE INVENTION

The invention generally relates to a valve. In particular, the invention includes a flow actuated valve which provides an ability to switch between more than one fluid using the flow selector valve and a lower-cost pump/set system that uses a pump originally designed for a single fluid. The flow actuated valve selects a fluid by changing the directional flow of the fluid within the valve to either allow the first fluid source or the second fluid source to flow therethrough.

Enteral feeding pumps are used to supply liquid nutrition to patients who are unable to eat. The pumping system consists of the pump and disposable tubing sets. The typical pump action is achieved by a rotary peristaltic design that uses an elastomeric tubing segment in contact with rotating rollers. The elastomeric segment is part of the disposable tubing set which connects the nutrient container to the patient feeding tube. With "standard" enteral pumps, water required for hydration is delivered to the patient by syringe by either direct connection to the patient feeding tube, or through an auxiliary port on the feeding tube or tube set. The caregiver feeds the patient using the pump and, after feeding, fills a syringe (typically 60 cc) with water and injects into the patient feeding tube one or more times. This involves labor and, if not followed rigorously, can affect patient health.

There are a number of manufacturers that produce enteral feeding pumps capable of also delivering water from a separate container. The pump designs either utilize dual motors/rotors, one for nutrient and one for water, with tubing joined distally by a Y-fitting, or a single motor/rotor with motorized valve actuator. Sets for the former design consist of two liquid source containers leading to two separate elastomeric tubing segments and hardware for mounting. Sets for the latter pump design consist or two separate liquid source containers with proximal tubing connected to a two-way valve followed by a single elastomeric segment and hardware for mounting. Both of these approaches use pump and set components that are higher cost than the "standard" single purpose nutrient pump and set.

Therefore, it would be particularly desirable to provide a flow actuated valve which provides an ability to switch between more than one fluid using a lower-cost pump/set system that uses a pump originally designed for a single fluid.

BRIEF SUMMARY OF THE INVENTION

The invention preserves the advantages of prior valves. In addition, it provides new advantages not found in currently available valves and overcomes many disadvantages of such currently available valves. In particular, the invention includes a flow actuated valve which provides an ability to switch between more than one fluid using the flow selector valve and a lower-cost pump/set system that uses a pump originally designed for a single fluid. The flow actuated valve selects a fluid by changing the directional flow of the fluid within the valve to either allow the first fluid source or the second fluid source to flow therethrough.

The flow actuated valve includes a valve body, a diverter member, an actuator member, and a check disk. The valve body includes an upper portion and a lower portion. The upper portion defines a first upper aperture for fluidly connecting to a first fluid source, a second upper aperture for fluidly connecting to a second fluid source, and a closed end. In one embodiment, the first upper aperture is located along a first horizontal axis. The second upper aperture is located along a second horizontal axis above the first horizontal axis. The first horizontal axis and the second horizontal axis being parallel to one another. Also, the second horizontal axis is located closer in distance to the closed end than the first horizontal axis.

The lower portion defining a lower aperture for allowing either a first fluid or a second fluid to exit therethrough. The lower portion defines one or more tiered portions. In one embodiment, the lower portion defines a first tiered portion, a second tiered portion, and a third tiered portion of the valve body. In one embodiment, the lower aperture is positioned proximal to the third tiered portion. In another embodiment, a single lower aperture is fluidly connected to a tube set for enteral feeding.

An actuator member is positioned within valve body. The actuator member includes a check disk configured to allow or block the flow of fluid through the actuator member and out of the lower aperture depending upon the direction of the flow of the fluid through the valve. In one embodiment, the check disk member includes a sealing portion configured for engaging an interior surface of the valve body. The actuator member may also include another sealing member or sealing portion for preventing fluid to contact the diverter member when the flow of fluid is reversed or changed in direction.

The actuator member defines one or more actuator grooves for engaging one or more splines located on an interior surface of the valve body. In one embodiment, the one or more splines includes one or splines defining one or more lengths. The actuator member defines one or more actuator projections for engaging the diverter member to rotate the diverter member and adjust the height position of the diverter member within the valve body.

The diverter member defines one or more diverter apertures for facilitating the flow of fluid from either the first liquid source or the second liquid source. The diverter member defines one or more recessed areas for engagement with one or more actuator projections of the actuator member to rotate the diverter member and adjust the height position of the diverter member to allow a first fluid or second fluid to flow. In addition, the recessed areas of the diverter member engages the one or more splines on an interior surface of the valve body to determine a low position of the diverter member to allow fluid from the first upper aperture or a high position of the diverter member to allow fluid from the second upper aperture.

In one embodiment, the diverter member is spring-biased downwardly towards the lower aperture. The diverter member is spring-biased using a spring member engaging an interior of the diverter member and the closed end of the valve body. The diverter member and the actuator member define inner cores for the passage of fluid therethrough.

The diverter member is engaged with the actuator member to allow the first fluid to flow through the first upper aperture or to allow the second fluid to flow through the second upper aperture. When the check disk member is closed, the diverter member engages the actuator member to allow a first fluid to flow through the first upper aperture or to allow a second fluid to flow through the second upper aperture.

In operation, the first fluid or the second fluid is selected by changing the directional flow of the fluid to close the check disk member which causes the actuator member to engage the diverter member to either allow the first fluid source or the second fluid source to flow therethrough.

In one embodiment, the flow actuated valve may be used with an enteral feeding pump and tubing set fluidly connected to the valve wherein the first fluid source is a liquid nutrient and the second fluid source is water.

It is therefore an object to provide a flow actuated valve which provides an ability to switch between more than one fluid.

It is another object to provide a flow actuated valve which can be use a lower-cost pump/tubing set system that uses a pump originally designed for a single fluid.

A further object is to provide a flow actuated valve that selects a fluid by changing the directional flow of the fluid within the valve to either allow the first fluid source of the second fluid source to flow therethrough.

Another object is to provide a safe and effective way for feeding patients more than one type of fluid using the flow selective valve.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENTS

Figure 1:
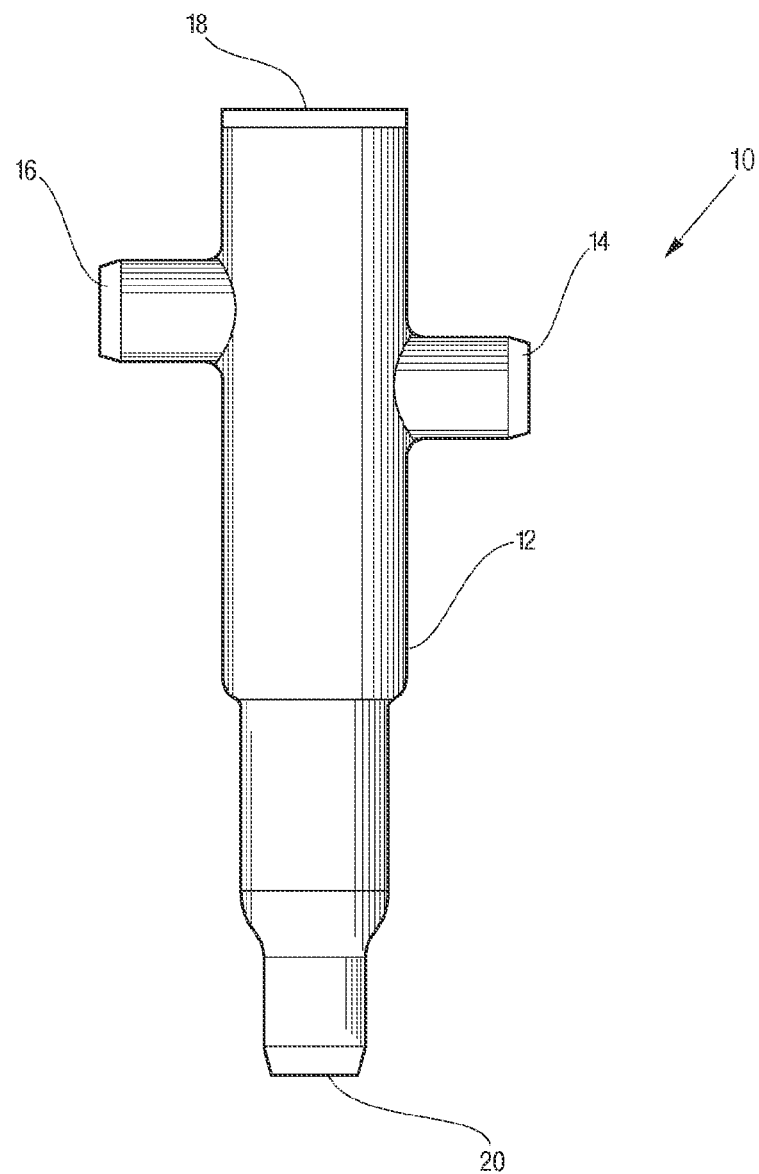
FIG. 1 is a front view of a flow actuated valve used in the present invention.
Figure 2:
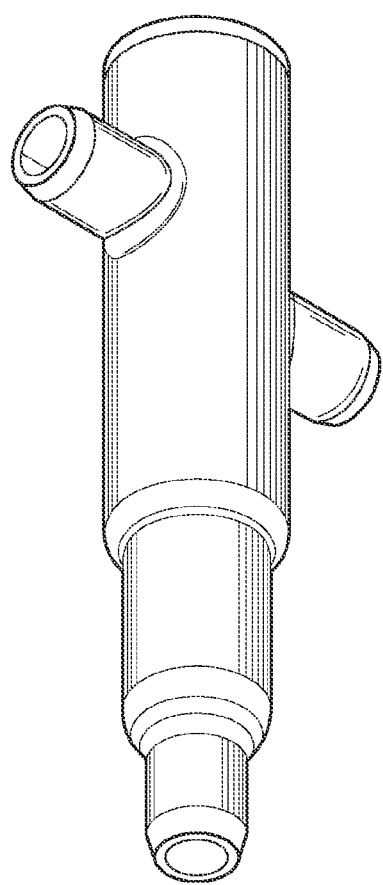
FIG. 2 is a perspective view of the flow actuated valve of FIG. 1.
Figure 3:
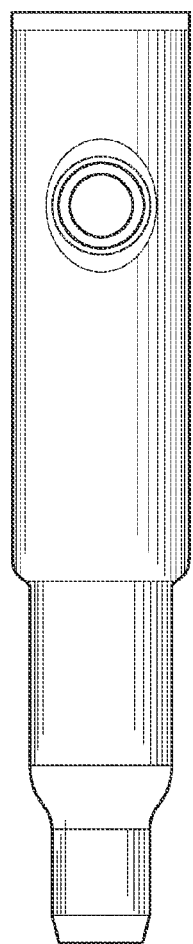
FIG. 3 is a left side view of the flow actuated valve of FIG. 1 with the second upper aperture closed.
Figure 4:
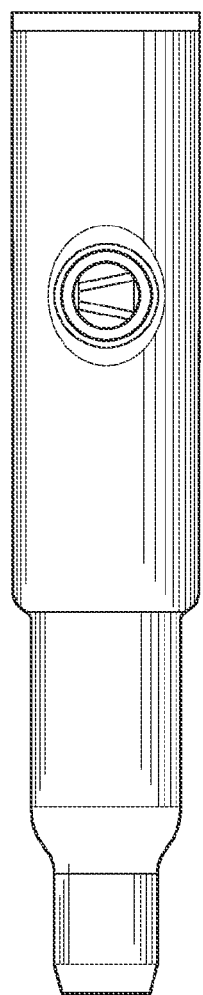
FIG. 4 is a right side view of the flow actuated valve of FIG. 1 with the first lower aperture open.

In accordance with the invention of FIGS. 1-25, the invention generally relates to a reverse flow actuated flow selector valve 10, more specifically, relates to a device, methods and systems for a flow actuated valve which provides an ability to switch between more than one fluid using the flow selector valve and a lower-cost pump/set system that uses a pump originally designed for a single fluid. The flow actuated valve selects a fluid by changing the directional flow of the fluid within the valve to either allow the first fluid source or the second fluid source to flow therethrough.

It should be understood that the flow selector valve is well suited and preferably used in medical environment; however, it may be used in any environment where delivery of more than one fluid using a single pump may be utilized. The invention will be disclosed herein in connection with a medical environment; however, the present invention is not intended to be limited to that particular use.

In one embodiment, the flow actuated valve is a reverse flow actuated flow selector valve. The reverse flow actuated flow selector valve is a two-way plastic valve or other suitable material that allows selection of a fluid or liquid source by momentarily reversing liquid through the valve. As generally illustrated in FIGS. 1-20, the reverse flow actuated selector valve 10 includes a valve body 12, a diverter member or rotary diverter member, an actuator member or shuttle actuator, and a check disk.

Referring to FIGS. 1-4, the valve body 12 includes an upper portion and a lower portion. The upper portion defines a first upper aperture 14 for fluidly connecting to a first fluid source (not shown), a second upper aperture 16 for fluidly connecting to a second fluid source (not shown), and a closed end 18. The closed end may include a cap or other device for securing the end opposite a lower aperture. The first and second upper apertures may fluidly connect to their respective first and second fluid sources using medical tubing or other methods or articles using in enteral feeding. In one embodiment, the upper portion may include first and second upper ports having a cylindrical shape defining the first and second apertures for engaging the end of the medical tubing. Alternatively, a protrusion or other recess in the upper portion may be used to connect the medical tubing. It should be appreciated that alternative configurations may include two or more upper apertures if there are two or more fluid sources with two or more different fluids or liquids. In one embodiment, the first fluid source is liquid nutrition and the second fluid source is water for enteral feeding.

In one embodiment, the first upper aperture is located along a first horizontal axis. The second upper aperture is located along a second horizontal axis above the first horizontal axis. The first horizontal axis and the second horizontal axis being parallel to one another. Also, the second horizontal axis is located closer in distance to the closed end than the first horizontal axis.

The lower portion defines a lower aperture 20 for allowing either a first fluid or a second fluid to exit therethrough. The lower portion defines one or more tiered portions. In one embodiment, the lower portion defines a first tiered portion, a second tiered portion, and a third tiered portion of the valve body. In one embodiment, the lower aperture is positioned proximal to the third tiered portion. In another embodiment, a single lower aperture is fluidly connected to the tube set of an enteral feeding system including an enteral pump.

Figure 5:
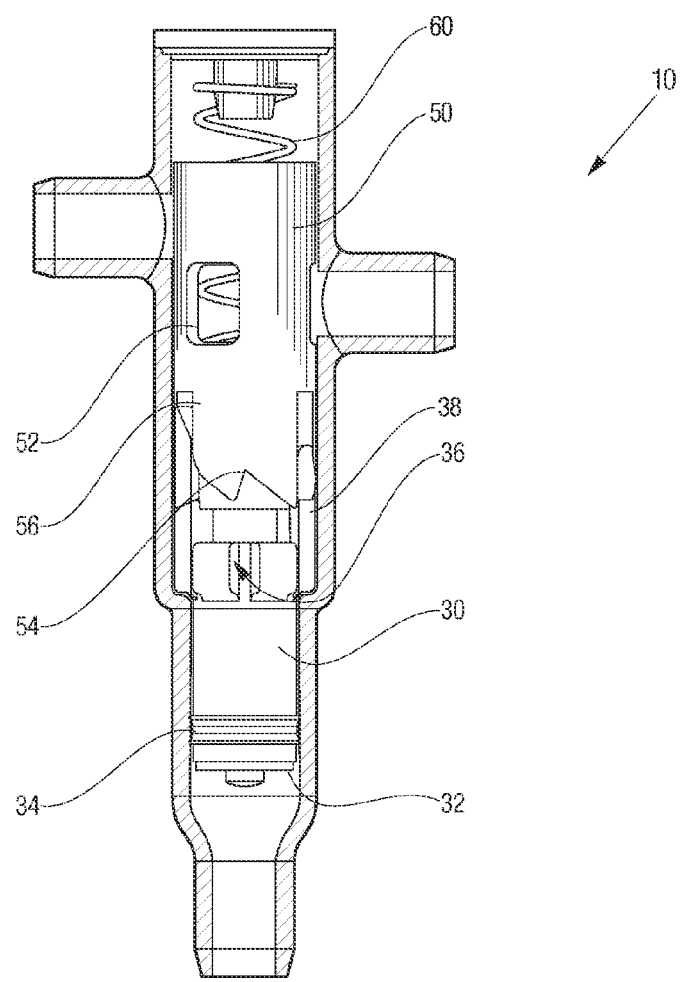
FIG. 5 is a transparent front view of the flow actuated valve of FIG. 1.
Figure 6:
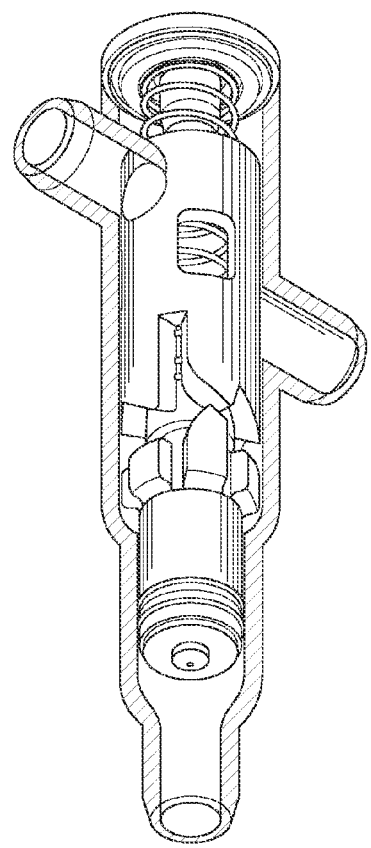
FIG. 6 is a transparent perspective view of the flow actuated valve of FIG. 1.
Figure 7:
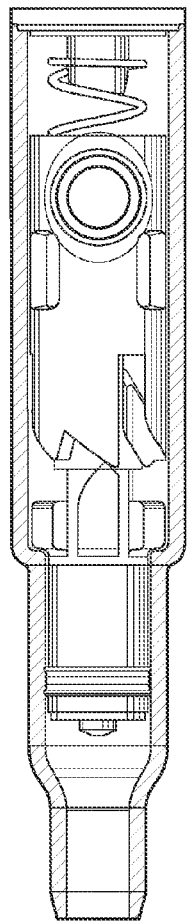
FIG. 7 is transparent left side view of the flow actuated valve of FIG. 1.
Figure 8:
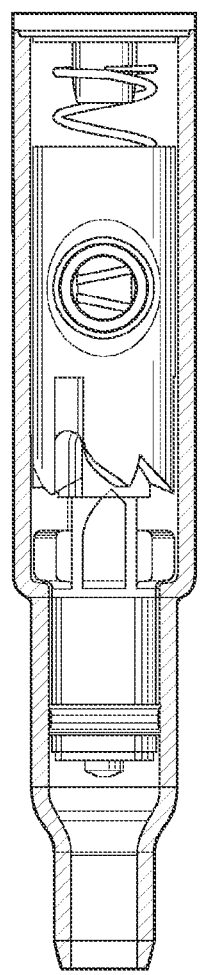
FIG. 8 is a transparent right side view of the flow actuated valve of FIG. 1.
Figure 9:
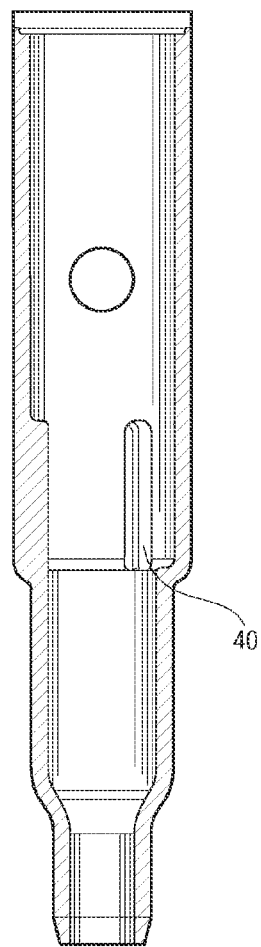
FIG. 9 is a cross sectional view of the valve body of FIG. 1 showing at least one spline on an interior surface thereof.
Figure 10:
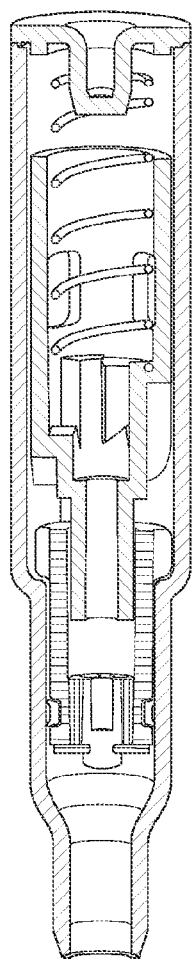
FIG. 10 is a cross sectional view of the flow actuated valve of FIG. 1.
Figure 11:
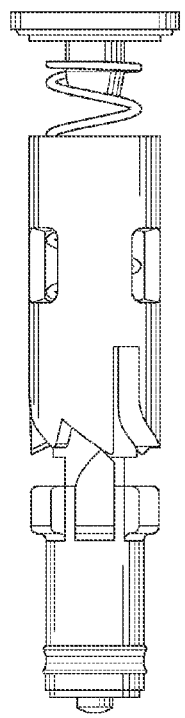
FIG. 11 is a front view of flow actuated valve of FIG. 1 without the valve body.
Figure 12:
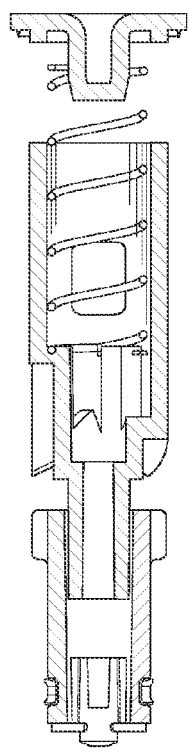
FIG. 12 is a cross sectional view of FIG. 11.
Figure 13:
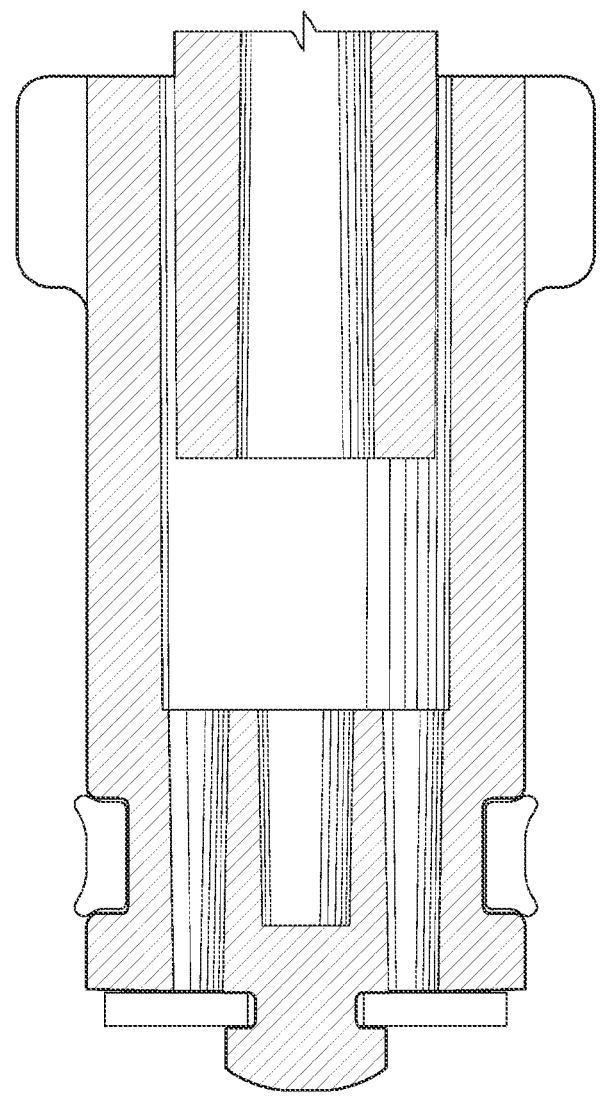
FIG. 13 is a partial view of FIG. 12.
Figure 14:
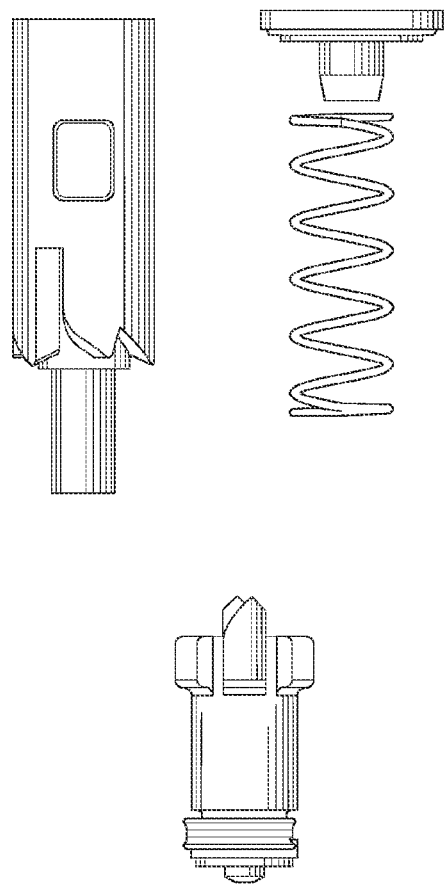
FIG. 14 is an exploded view of FIG. 11.
Figure 15:
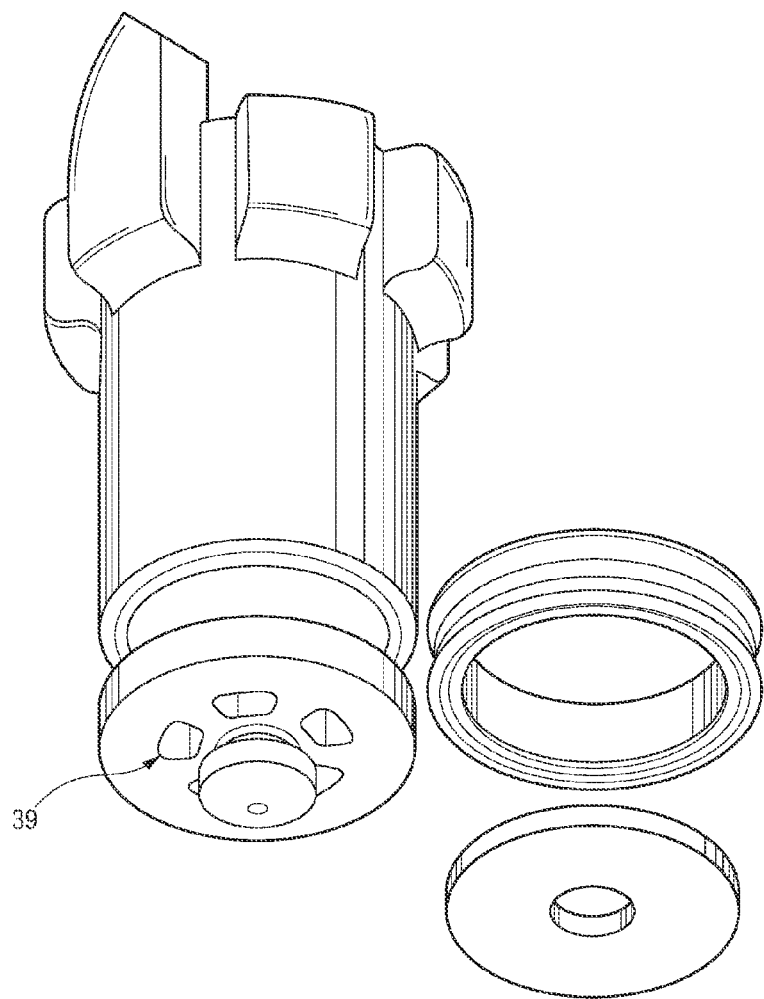
FIG. 15 is an exploded view of the actuator member of FIG. 14.
Figures 16A, 16B:
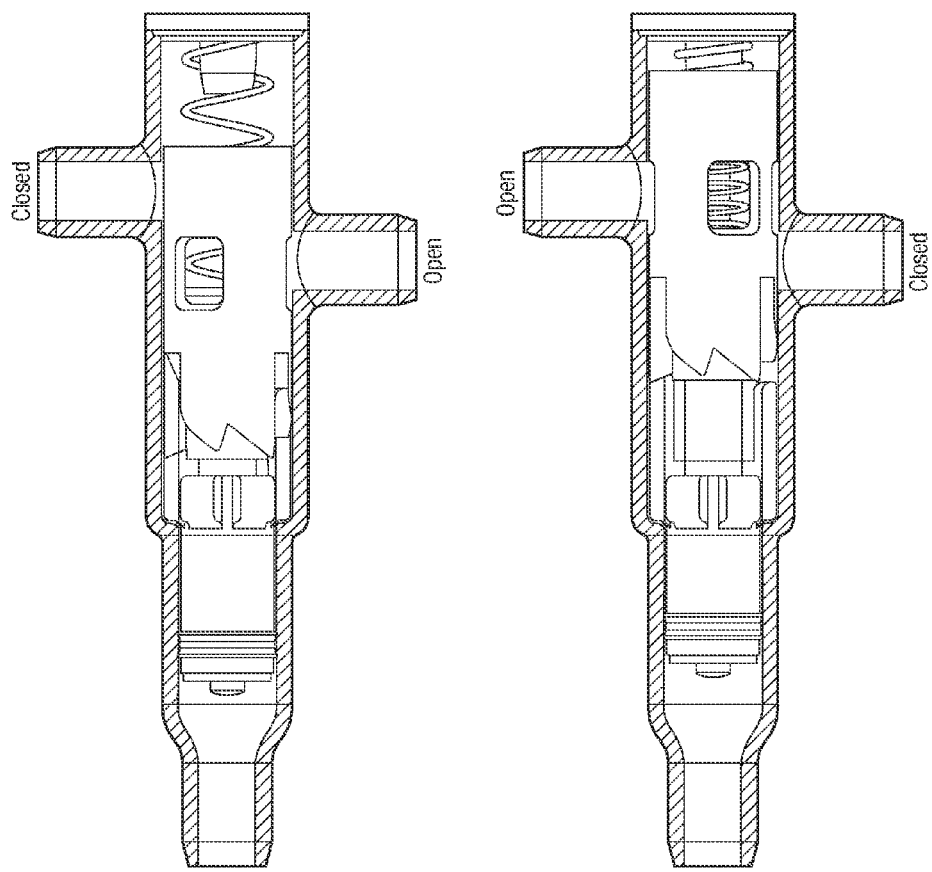
FIG. 16 is a transparent front view of the first position and second position of the flow actuated valve.
Figure 17A:
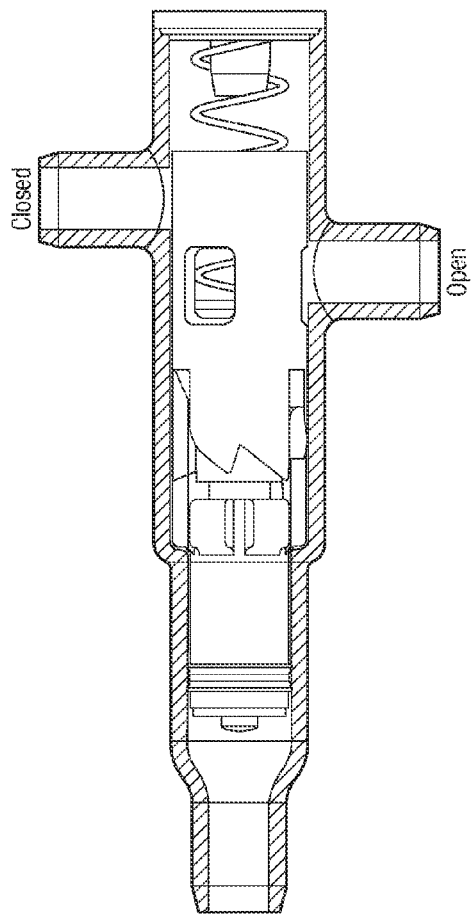
FIG. 17 is a transparent front view of the first position and second position of the flow actuated valve of FIG. 16.
Figure 17B:
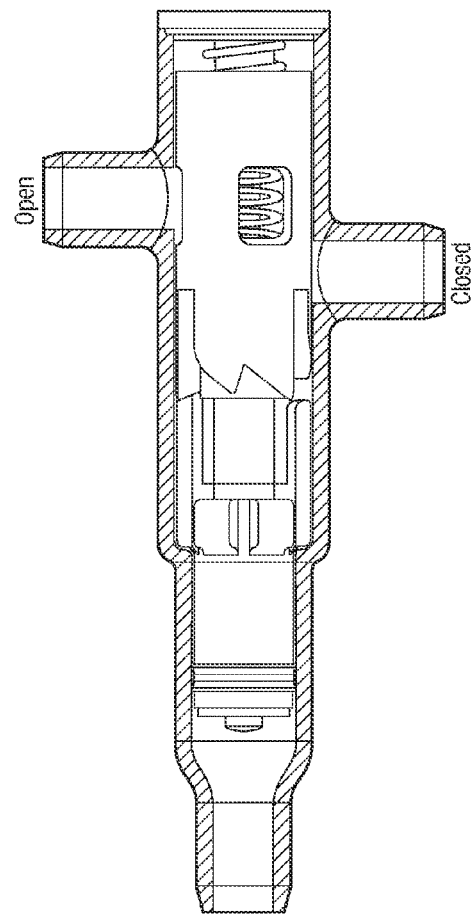
Figure 18:
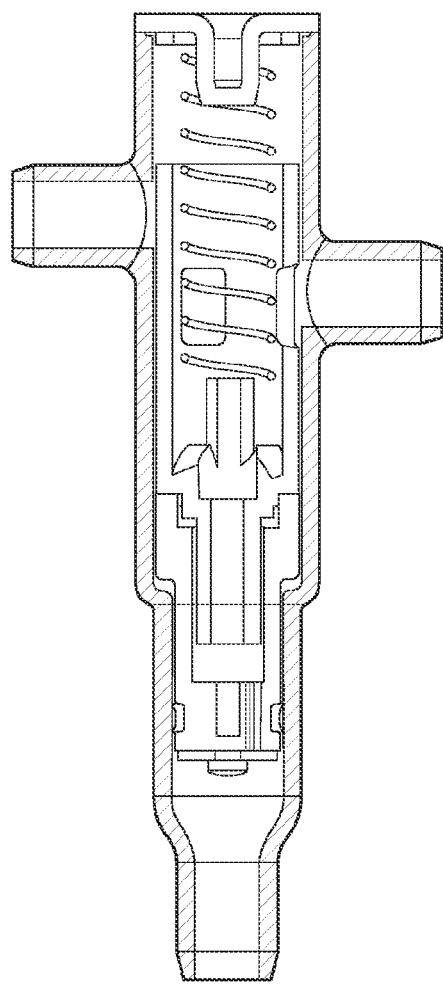
FIG. 18 is a cross sectional view of the first position of the flow actuated valve of FIG. 16.
Figure 19:
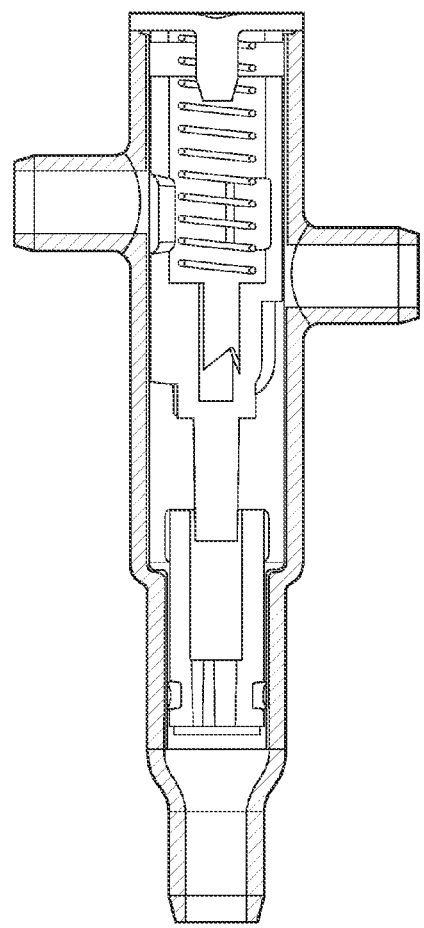
FIG. 19 is a cross sectional view of the second position of the flow actuated valve of FIG. 16.
Figure 20:
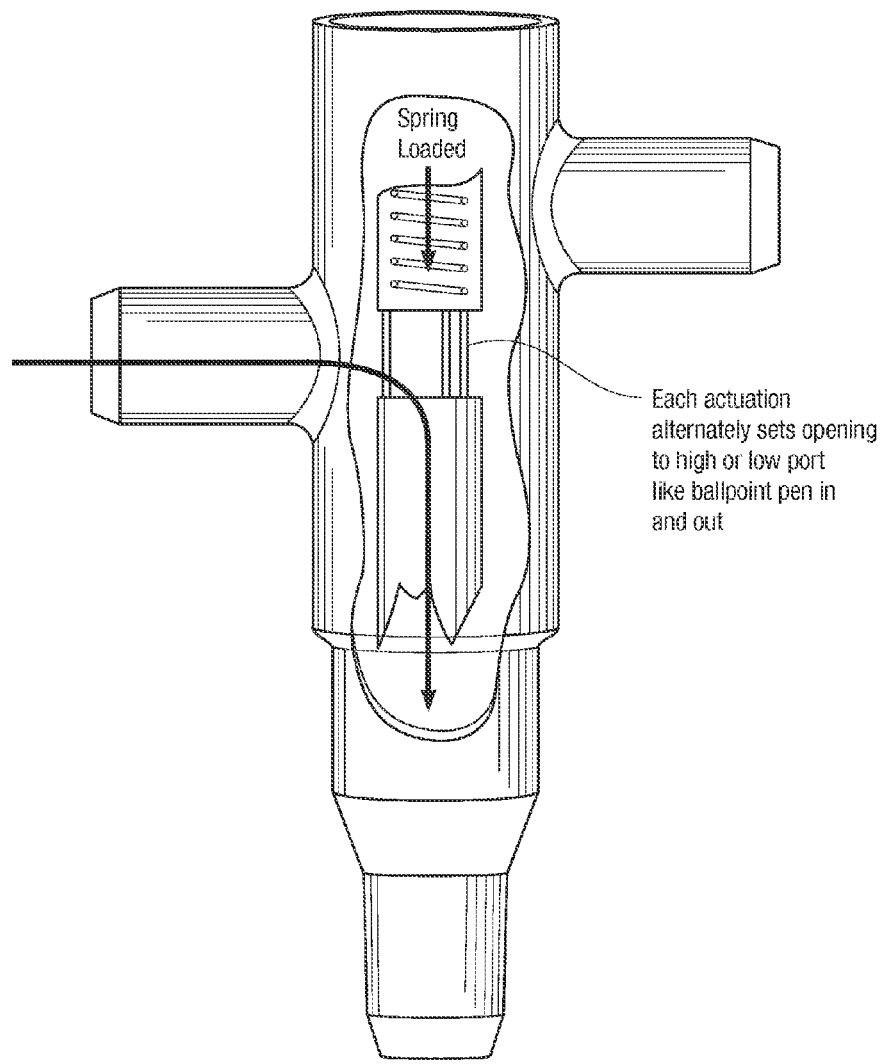
FIG. 20 is a front view of the flow actuated valve of FIG. 1.
Figure 21:
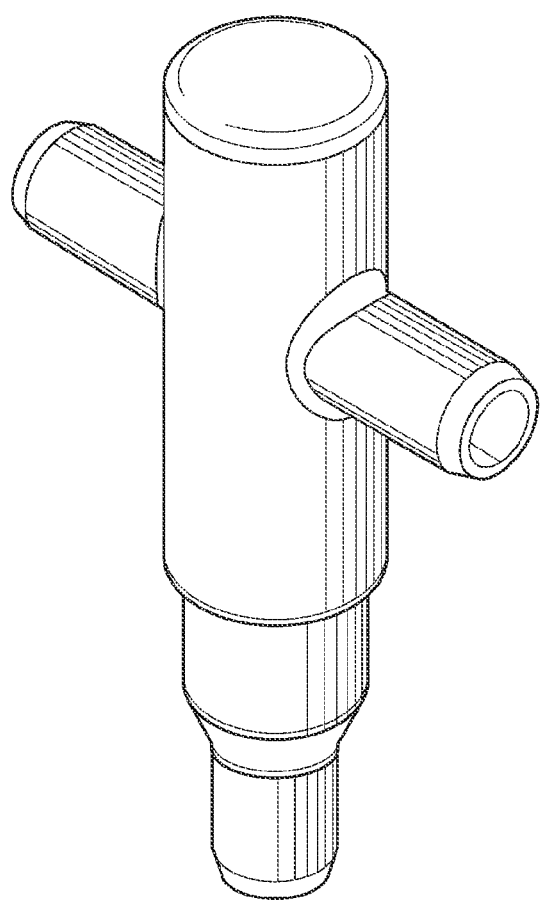
FIG. 21 is a front perspective view of another embodiment of the flow actuated valve of the present invention.
Figure 22:
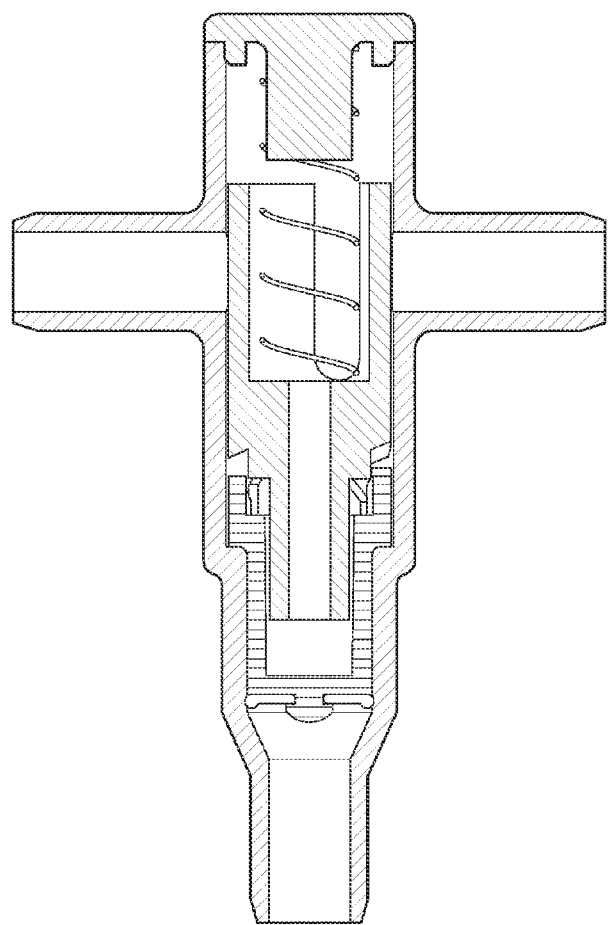
FIG. 22 is a cross sectional view of the flow actuated valve of FIG. 21.
Figure 23:
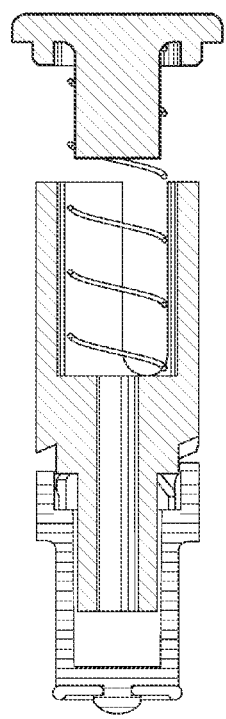
FIG. 23 is a cross sectional view of the flow actuated valve of FIG. 22 without the valve body.
Figure 24:
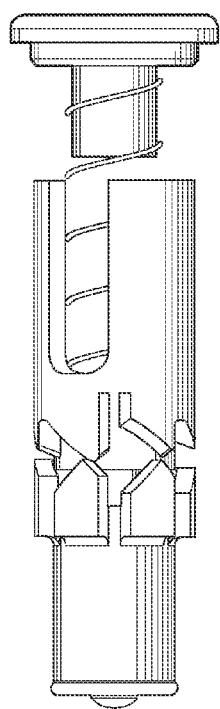
FIG. 24 is a front view of the flow actuated valve of FIG. 23 without the valve body.

Referring to FIGS. 5-6, an actuator member 30 is positioned within the valve body. The actuator member includes a check disk 32 configured to allow or block the flow of fluid through the actuator member and out of the lower aperture depending upon the direction of the flow of the fluid through the valve. For example, when the direction of the flow of the fluid is in the forward direction, the check disk allows the flow of fluid through the actuator member. Alternatively, when the direction of the flow of the fluid is in the reverse direction, the check disk blocks the flow of fluid through the actuator member. In one embodiment, the check disk member includes a sealing portion configured for engaging an interior surface of the valve body. The actuator member may also include another sealing member 34 or sealing portion for preventing fluid to contact the diverter member when the flow of fluid is reversed or changed in direction.

Referring to FIGS. 7-15, the actuator member defines one or more actuator grooves 36 for engaging one or more splines 40 located on an interior surface of the valve body. The actuator grooves engages the splines to move along a vertical axis within the valve body. In one embodiment, the one or more splines includes one or splines defining one or more lengths. In one embodiment, there are three splines with two having similar length. The actuator member also defines one or more actuator projections 38 for engaging the diverter member 50 to rotate the diverter member and adjust the height position of the diverter member within the valve body when the check disk blocks the flow of fluid through the actuator member.

The diverter member 50 defines one or more diverter apertures 52 for facilitating the flow of fluid from either the first liquid source or the second liquid source. In one embodiment, there are three diverter apertures spaced 120 degrees apart. Of course, it is contemplated that there may be more than or less than three diverter apertures spaced apart at different degrees depending upon the desired number of fluid sources.

The diverter member defines one or more recessed areas for engagement with one or more actuator projections 54, 56 of the actuator member to rotate the diverter member and adjust the height position of the diverter member to allow a first fluid or second fluid to flow through the diverter apertures. In addition, the recessed areas of the diverter member engages the one or more splines on an interior surface of the valve body to determine a first position (FIGS. 16A, 17A, 18) of low height of the diverter member to allow fluid through the first upper aperture for a first fluid or a second position (FIGS. 16B, 17B, 19) of a higher height of the diverter member to allow fluid from the second upper aperture for a second fluid.

The diverter member and the actuator member define inner cores for the passage of fluid therethrough. In one embodiment, the actuator member has a top portion near the check disk which defines one or more orifices 39 to allow the flow of fluid therethrough. In one embodiment, the top portion of the actuator member has six orifices for the flow of fluid therethrough. In one example of operation, the flow of fluid goes through an upper aperture, through the diverter aperture, through the inner core of the divert member, through the inner core of the actuator member, through one or more orifices in the top portion of the actuator member, and exits out of the lower aperture of the valve.

In one embodiment, the diverter member is spring-biased downwardly towards the lower aperture. The diverter member is spring-biased using a spring member 60 engaging an interior of the diverter member and the closed end of the valve body.

When the check disk member is closed, the diverter member engages the actuator member to allow a first fluid to flow through the first upper aperture or to allow a second fluid to flow through the second upper aperture. The diverter member is engaged with the actuator member to allow the first fluid to flow through the first upper aperture or to allow the second fluid to flow through the second upper aperture.

Referring to FIGS. 16-20, in operation, the first fluid or the second fluid is selected by changing the directional flow of the fluid to close the check disk member which causes the actuator member to engage the diverter member to either allow the first fluid source or the second fluid source to flow therethrough.

For example, when fluid is flowing in the forward direction, a first liquid flows through the first upper aperture with the diverter member in the first position (FIG. 16A, 17A, 18), through the inner core of the diverter member, through the inner core of the actuator member, past the check disk, and exits out of the lower aperture. If the flow of fluid is in a reverse direction (opposite of the forward direction), the check disk moves to impede or block flow back through the actuator member. The reverse flow of the fluid moves the actuator member along the splines to engage the diverter member.

The projections on the actuator member engage recessed areas on the diverter member causing the diverter member to rotate, preferably 120 degrees, and adjust the height of the diverter member apertures relative to the first and second upper apertures. Of course, it is contemplated that 90 degrees of rotation or other degrees of rotation may be used in alignment with the position and number of the diverter member apertures of the diverter member.

The diverter member, upon engagement with the actuator member, switches from a first position at a low height for the first upper aperture to deliver a first fluid into the valve through a diverter member aperture to a second position (FIGS. 16B, 17B, 19) at a higher height for the second upper aperture to deliver a second fluid into the valve through another diverter member aperture. When the flow direction is changed again (forward flow), the check disk opens and flow allows the second liquid to flow through the valve. Of course, this process can be repeated to return to the first fluid.

Referring to FIGS. 21-24, another embodiment of the reverse flow actuated flow selector valve is illustrated. The reverse flow actuated flow selector valve includes a two-way plastic valve that allows selection of a liquid source by momentarily reversing liquid through the valve. The flow selector valve includes a valve body, rotary diverter, shuttle actuator, and check disk. When operating in the forward direction, a first liquid flows through a first port with the rotary diverter in the open position, through a core of the rotary diverter, through a core of the shuttle actuator, and past the check disk.

If liquid flow is reversed, the check disk moves to impede flow back through the shuttle actuator. Pressure forces due to the reverse flow of the liquid moves the shuttle actuator towards the rotary diverter. Splines on the shuttle actuator engage splines on the rotary diverter causing the rotary diverter to rotate, preferably 90 degrees. When flow direction is reversed again (forward flow) the check disk opens and flow cause the shuttle actuator to move into additional splines which again rotate another 90°. The diverter is now position to allow a second liquid to flow through a second port. This process can be repeated to return to flow through port 1. The invention proposed utilizes the existing Sentinel Enteral Feeding pump which is capable of optically distinguishing liquid nutrient versus water which enables positive control of liquid selection.

Figure 25:
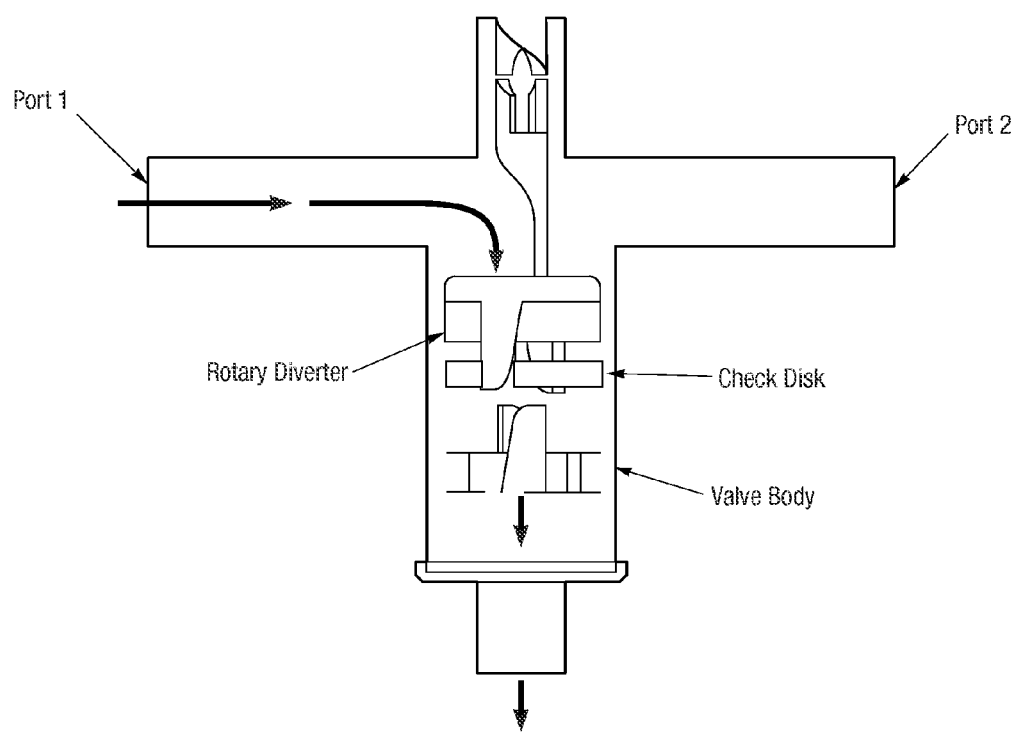
FIG. 25 is a cross sectional view of another embodiment of the flow actuated valve of the present invention.

As illustrated in FIG. 25, in an alternative embodiment, the reverse flow actuated flow selector valve is a two-way plastic valve that allows selection of a liquid source by momentarily reversing liquid flow through the valve. In one embodiment, the valve is made of injection molded plastic. The valve includes the valve body, rotary diverter, shuttle actuator and check disk. When operating in the forward direction liquid flows through the Port 1 with diverter in the open position, through the core of the diverter, through the core of the shuttle and past the check disk.

If liquid flow is reversed, the check disk moves to impede flow back through shuttle. Pressure forces the shuttle to move toward the rotary diverter. Splines on the shuttle engage those on the diverter causing the diverter to rotate 90°. When flow direction is reversed again (forward flow) the check disk opens and flow cause the shuttle to move into additional splines which again rotate another 90°. The diverter is now position to allow flow to enter from Port 2. This process can be repeated to return to flow through Port 1.

In one embodiment, the flow actuated valve may be used with an enteral feeding pump and a tubing set fluidly connected to the valve wherein the first fluid source is a liquid nutrient and the second fluid source is water. For an example of an enteral feeding pump, the flow actuated valve may utilize the Sentinel® Enteral Feeding pump which is capable of optically distinguishing liquid nutrient versus water which enables positive control of liquid or fluid selection.

It would be appreciated by those skilled in the art that various changes and modifications can be made to the illustrated embodiments without departing from the spirit of the present invention. All such modifications and changes are intended to be within the scope of the present invention.

What is claimed is:

1. A flow actuated valve, comprising:
    a valve body having an upper portion and a lower portion, said upper portion defining a first upper aperture for fluidly connecting to a first fluid source and a second upper aperture for fluidly connecting to a second fluid source, said lower portion defining a lower aperture for allowing either a first fluid or second fluid to exit therethrough;
    an actuator member positioned within valve body, the actuator member includes a check disk configured to allow or block the flow of fluid through the actuator member and out of the lower aperture depending upon the direction of the flow of the fluid through the valve;
    a diverter member engaged to the actuator member to allow the first fluid to flow through the first upper aperture or to allow the second fluid to flow through the second upper aperture; and
    whereby the first fluid or the second fluid is selected by changing the directional flow of the fluid to close the check disk member which causes the actuator member to engage the diverter member to either allow the fluid flow from the first fluid source or allow the fluid flow from the second fluid source.

2. The valve of claim 1, wherein said first upper aperture is located along a first horizontal axis, said second upper aperture is located along a second horizontal axis above the first horizontal axis, and said first horizontal axis and said second horizontal axis being parallel to one another.

3. The valve of claim 2, wherein said second horizontal axis is located closer to a closed end of the upper portion than the first horizontal axis.

4. The valve of claim 1, wherein the lower portion defines a first tiered portion, a second tiered portion, and a third tiered portion of the valve body.

5. The valve of Claim 4, wherein the lower aperture is positioned proximal the third tiered portion.

6. The valve of claim 1, wherein the diverter member and the actuator member define inner cores for the passage of fluid therethrough.

7. The valve of claim 1, wherein the actuator member includes a sealing member for preventing fluid to contact the diverter member when the flow of fluid is reversed.

8. The valve of claim 1, wherein the actuator member defines one or more actuator grooves for engaging one or more splines on an interior surface of the valve body.

9. The valve of claim 8, wherein the one or more splines includes one or more splines defining one or more lengths.

10. The valve of claim 1, wherein the actuator member defines one or more actuator projections for engaging the diverter member.

11. The valve of claim 1, wherein the diverter member defines one or more diverter apertures for facilitating the flow of fluid from either the first liquid source or the second liquid source.

12. The valve of claim 10, wherein the diverter member defines one or more recessed areas for engagement with one or more projections of the actuator member to rotate the diverter member and adjust the height position of the diverter member to allow a first fluid or second fluid to flow.

13. The valve of claim 12, wherein the recessed areas of the diverter member engages one or more splines on an interior surface of the valve body to determine a low position of the diverter member to allow fluid from the first upper aperture or a high position of the diverter member to allow fluid from the second upper aperture.

14. The valve of claim 1, wherein the diverter member is spring-biased downwardly towards the lower aperture.

15. The valve of claim 14, wherein the diverter member is spring-biased using a spring member engaging an interior of the diverter member.

16. The valve of claim 1, wherein the check disk member includes a sealing portion configured for engaging an interior surface of the valve body.

17. The valve of claim 1, wherein the valve is a reverse flow actuated flow selector valve.

18. The valve of claim 1, wherein the upper portion includes a closed end.

* * * * *